May 4, 1948.  K. L. TATE  2,441,044
SWITCHING AND TIMING UNIT FOR PNEUMATIC RELAYS
Filed July 26, 1946
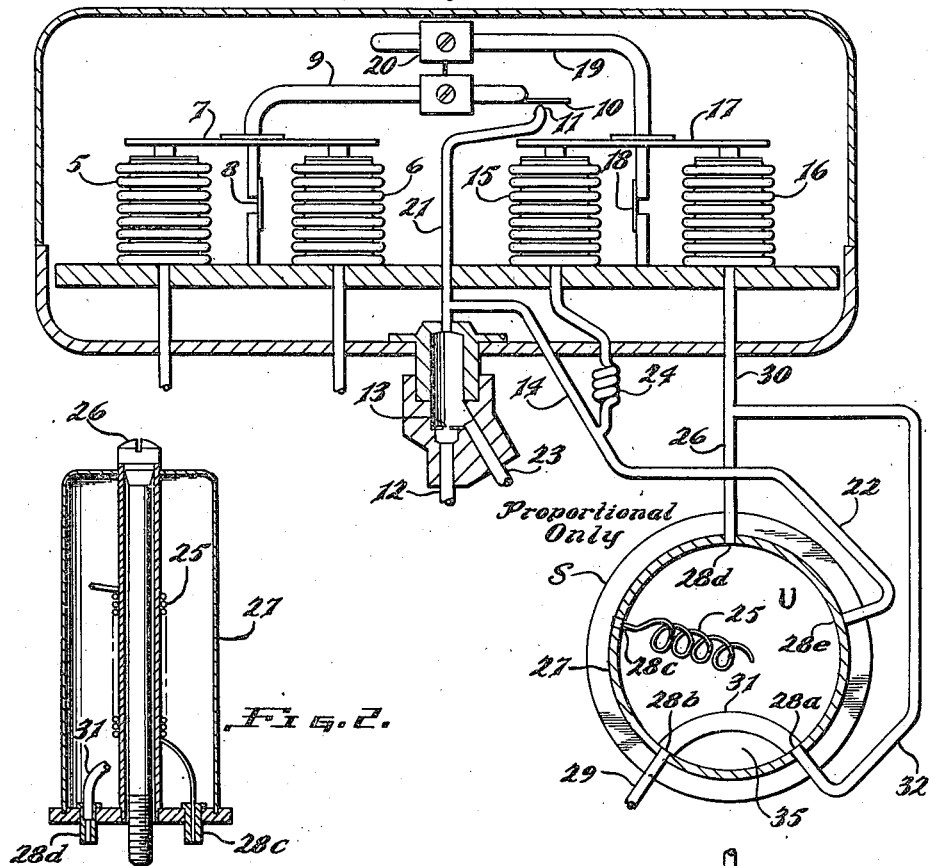
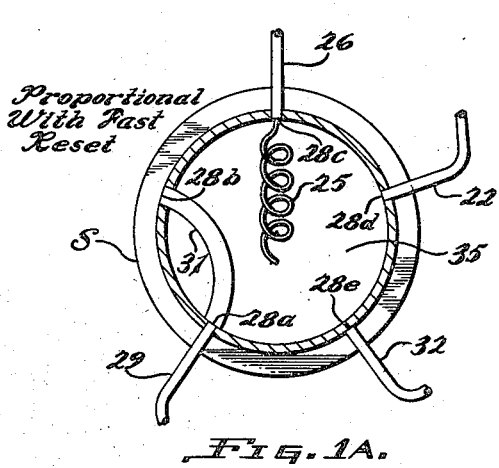
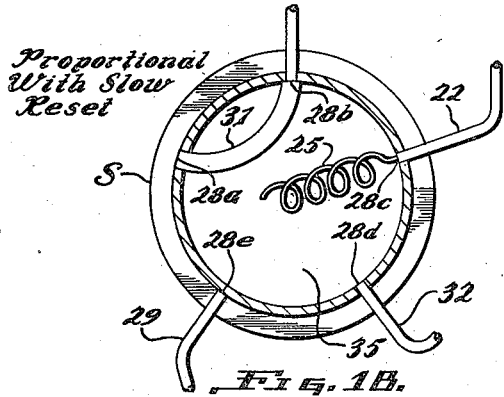
Inventor
Kenneth L. Tate
By Robert A. Lavender
Attorney Patented May 4, 1948

2,441,044

UNITED STATES PATENT OFFICE 2,441,044

SWITCHING AND TIMING UNIT FOR PNEUMATIC RELAYS

Kenneth L. Tate, Rochester, N. Y., assignor, by mesne assignments, to the United States of America as represented by the United States Atomic Energy Commission Application July 26, 1946, Serial No. 686,475

3 Claims. (Cl. 137—153)

This invention relates to a pneumatic damping and switching unit, or like arrangement, whereby the piping connections in a pneumatic relay of the force-balance or other type can be simply interchanged so that the reset function of the relay may be omitted, or the timing rate of said reset function may be changed to any one of several values.

The present invention has particular application to a so-called pneumatic reset relay of the force-balance type, although it will be readily apparent that this invention is applicable to various types of pneumatic relays.

In the drawings, Fig. 1 is a diagrammatic showing of the parts of a pneumatic relay in side elevation, indicating one of several ways in which the damping unit of this invention can be connected therein; Fig. 1a and Fig. 1b show other possible connections of the damping unit to the relay of Fig. 1; and Fig. 2 is a vertical section through the damping unit.

In the pneumatic relay herein illustrated, there is provided a so-called primary system comprising a bellows 5 into which a variable pressure, resulting from the deviation in a variable condition to be controlled, is introduced and also a bellows 6 into which there is introduced an adjustable reference pressure that remains at a fixed value for any given adjustment. The bellows 5 and 6 preferably have their respective lower ends secured to a support S. The tops of the bellows are respectively attached to opposite ends of a rocker arm 7 which is adapted to rock about a flexible strip or spring pivot 8. The rocker arm is secured to a primary lever arm 9 provided at its right-hand end (Fig. 1) with a baffle 10. This baffle cooperates with a nozzle 11 to which compressed air is supplied from a source 12 through the restriction 13.

The relay also includes a secondary system comprising bellows 15 and 16, which are suitably mounted on the support S of the relay. The upper ends of the bellows 15 and 16 are, respectively, connected to the ends of a rocker arm 17 similar to rocker arm 7, already described and adapted to rock about a flexible strip or spring pivot 18. The rocker arm 17 is secured to a secondary lever arm 19 which is connected to the primary lever arm 9 by a flexible connecting link 20 adjustable to the right or to the left to change the ratio of motion of the levers 9 and 19. The operation of the portion of the relay thus far described is similar to that already disclosed in the copending application of Floyd B. Newell, Serial No. 668,304, filed May 8, 1946, relating to "An adjusting arrangement for pneumatic relays of the force-balance type." Structurally these parts of the pneumatic relay, herein diagrammatically disclosed, may be identical with those illustrated in the mentioned copending application, except that herein the reset bellows 16 replaces the coil spring 22 in the device disclosed in the mentioned application.

The back pressure in the pipe 21 between the nozzle 11 and the restriction 13 is introduced through pipe 14 and restriction 24 into bellows 15. The capillary restriction 24 is used in the pipe leading to the bellows 15 to stabilize the action of the relay. The back pressure in pipe 21 and the chamber above the orifice 13 is used to control the process and is connected therewith through the output connection 23. A controlled pressure from an outside source is supplied through pipe 29, jumper 31 in the damping unit U and pipes 32 and 30 to bellows 16. It will be understood that the relay is in equilibrium when the force due to the pressure in bellows 5 balances that due to the pressure in bellows 6, both acting on rocker arm or beam 7 and at the same time force due to the pressure in bellows 15 balances that due to the pressure in bellows 16, both acting on rocker arm or beam 17. Under these conditions there is no force transmitted by the link 20 from the primary lever 9 to the secondary lever 19 or vice versa. Furthermore, the relay is in equilibrium when three given conditions exist simultaneously. The first condition is that there is a difference between the forces due to the pressures in bellows 5 and 6 which supplies a torque to the primary lever 9. The second condition is that there is a difference between the forces due to the pressures in the secondary bellows 15 and 16 which supplies a torque to the secondary beam 19. The third condition is that the torques on the primary beam 9 and the secondary beam 19 are such that the forces at the connecting link 20 are equal and opposite.

A particular feature of the invention relates to the mentioned damping unit U used for conveniently switching the pressure connections to different parts of the relay whereby the relay, under one set of connections, functions with a loading pressure supplied directly to the bellows 16 as in Fig. 1 or, under two other different sets of connections, as shown in Figs. 1a and 1b, with a pressure supplied through a restriction 25 in such a way as to cause the relay to have either one of two reset rates, respectively. This switching unit U is shown in vertical section in Fig. 2, and consists essentially of a can or tank 27 which is annular in horizontal section to permit a holding screw 26 to pass axially therethrough. From the bottom of the tank 27, which is otherwise sealed, there project five prongs 28a, 28b, 28c, 28d and 28e. Prongs 28a and 28b are both hollow and are internally connected within the can 27 by the jumper or pipe 31. Prong 28c is also hollow and is internally connected with one end of the capillary resistance 25 which is coiled as shown in Fig. 2 and which communicates at its free end with the interior of the can 27. Prong 28d is hollow for connecting the piping to the interior of the can, while prong 28e is solid. These prongs which have the appearance of the prongs of a so-called vacuum tube used in the radio art, plug into corresponding recesses or socket openings one of which openings is not connected in the piping in the support S such blind socket opening serving to close off any open prong which is inserted therein. A suitable gasket (not shown) is used to prevent leakage between the tank and the support against which it is held tightly by means of the mentioned screw 26. The tank can be separated from the base, and after rotation it can be plugged into the base in as many different positions as there are pressure connections (in this example five), and several of these positions (in this example three consecutive ones) are used to make the proper connections in the piping to produce the desired result.

In this particular example, when the tank 27 containing the capillary 25, is set in position illustrated in the diagram of Fig. 1, the relay operates in proportional response without reset and the pressure in bellows 16 is supplied from the outside pressure source, through pipe 29, jumper 31 and pipe 32 and 30. The other passages in the damping unit are closed capillary tube 25 being closed by the above mentioned blind socket.

When the damping unit is set in the position of Fig. 1a the relay operates in proportional response plus fast reset rate of effect and the pressure in bellows 16 is supplied from the nozzle back pressure in the pipe 21, through the pipes 14 and 22, the tank space 35, the capillary restriction 25 and the pipes 26 and 30. Under this last specified condition the relay is automatically restored to a condition of equilibrium after a certain length of time which is determined by the amount of restriction in the capillary 25 and the volume of the bellows 16 and attached piping.

When the damping unit is set in position shown in Fig. 1b, the relay operates in proportional response plus slow reset rate of effect and the pressure in bellows 16 is supplied from the nozzle back pressure in the pipe 21 through the pipes 14 and 22, restriction 25, tank space 35, pipes 32 and 30. In this case the volume 35 in the damping unit is added to that of the bellows 16 and attached piping. When the tank S is in this position, prong 28a is closed by the above mentioned blind socket.

I claim:
1. In combination with a pneumatically-operated relay having pipes with terminals variably connectible to certain parts of the relay to conduct a pneumatic medium thereto, said parts being designed to have different operating characteristics depending on the presence or absence of pneumatic damping therein as well as on the time factor of said damping when present, and a damping unit comprising a tank sealed except for certain hollow prongs, at least one of said prongs communicating directly with the interior of said tank, a second prong communicating with the interior of said tank through a resistance, said prongs being selectively insertible into said terminals.

2. In combination with a pneumatically-operated relay having pipes with terminals variably connectible to certain parts of the relay to conduct a pneumatic medium thereto, said parts being designed to have different operating characteristics depending on the presence or absence of pneumatic damping therein as well as on the time factor of said damping when present, and a damping unit comprising a tank sealed except for certain hollow prongs, at least one of said prongs communicating directly with the interior of said tank, a second prong communicating with the interior of said tank through a capillary-type resistance located within the tank, said prongs being selectively insertible into said terminals.

3. In combination with a pneumatically-operated relay having pipes with terminals variably connectible to certain parts of the relay to conduct a pneumatic medium thereto, said parts being designed to have different operating characteristics depending on the presence or absence of pneumatic damping therein as well as on the time factor of said damping when present, and a damping unit comprising a tank sealed except for certain hollow prongs, at least one of said prongs communicating directly with the interior of said tank, a second prong communicating with the interior of said tank through a resistance, a third prong and a fourth prong communicating with each other through a pipe mounted within said tank, said prongs being selectively insertible into said terminals.

KENNETH L. TATE.

REFERENCES CITED

The following references are of record in the file of this patent:

UNITED STATES PATENTS

| Number | Name | Date |
| --- | --- | --- |
| 2,360,889 | Philbrick | Oct. 24, 1944 |
| 2,413,584 | Side | Dec. 31, 1946 |